(12) United States Patent
Carrender et al.

(10) Patent No.: US 7,639,119 B2
(45) Date of Patent: *Dec. 29, 2009

(54) SYSTEM AND METHOD FOR INVENTORYING MULTIPLE REMOTE OBJECTS

(75) Inventors: Curtis L. Carrender, Morgan Hill, CA (US); Ronald W. Gilbert, Morgan Hill, CA (US)

(73) Assignee: Battelle Memorial Institute K1-53, Richland, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/864,112

(22) Filed: Sep. 28, 2007

(65) Prior Publication Data

US 2008/0018434 A1 Jan. 24, 2008

Related U.S. Application Data

(63) Continuation of application No. 10/425,232, filed on Apr. 28, 2003, now Pat. No. 7,286,043.

(51) Int. Cl.
*H04Q 5/22* (2006.01)

(52) U.S. Cl. .............. 340/10.42; 340/10.34; 340/10.51; 340/572.1; 340/825.49

(58) Field of Classification Search .............. 340/10.31, 340/10.51, 10.32, 825.35, 825.49, 571.1, 340/10.1, 10.33, 5.61, 5.9, 5.91, 5.92, 568.1, 340/572.1, 572.4, 10.34; 235/375, 385, 492
See application file for complete search history.

(56) References Cited

U.S. PATENT DOCUMENTS

| | | | | |
|---|---|---|---|---|
| 4,827,395 A | * | 5/1989 | Anders et al. | 700/9 |
| 5,099,346 A | * | 3/1992 | Lee et al. | 398/118 |
| 5,565,858 A | * | 10/1996 | Guthrie | 340/10.33 |
| 5,682,142 A | * | 10/1997 | Loosmore et al. | 340/572.1 |
| 5,804,810 A | | 9/1998 | Woolley et al. | |
| 5,841,365 A | * | 11/1998 | Rimkus | 340/5.61 |
| 5,952,922 A | | 9/1999 | Shober | |
| 6,297,734 B1 | | 10/2001 | Richardson et al. | |
| 6,353,406 B1 | * | 3/2002 | Lanzl et al. | 342/118 |
| 6,826,514 B1 | | 11/2004 | Antico et al. | |
| 6,972,682 B2 | * | 12/2005 | Lareau et al. | 340/568.1 |

FOREIGN PATENT DOCUMENTS

WO 01/06444 A1 1/2001

* cited by examiner

*Primary Examiner*—Edwin C Holloway, III
(74) *Attorney, Agent, or Firm*—Seed IP Law Group PLLC

(57) ABSTRACT

A system and method of inventorying multiple objects utilizing a multi-level or a chained radio frequency identification system. The system includes a master tag and a plurality of upper level tags and lower level tags associated with respective objects. The upper and lower level tags communicate with each other and the master tag so that reading of the master tag reveals the presence and absence of upper and lower level tags. In the chained RF system, the upper and lower level tags communicate locally with each other in a manner so that more remote tags that are out of range of some of the upper and lower level tags have their information relayed through adjacent tags to the master tag and thence to a controller.

19 Claims, 5 Drawing Sheets

SYSTEM AND METHOD FOR INVENTORYING MULTIPLE REMOTE OBJECTS

CROSS-REFERENCE TO RELATED APPLICATION

This application is a continuation of U.S. patent application Ser. No. 10/425,232, filed Apr. 28, 2003, now U.S. Pat. No. 7,286,043, which application is incorporated herein by reference in its entirety.

STATEMENT REGARDING FEDERALLY SPONSORED RESEARCH OR DEVELOPMENT

This invention was made with U.S. Government support under Contract DE-AC0676RLO1830 awarded by the U.S. Department of Energy. The U.S. Government has certain rights in the invention.

BACKGROUND OF THE INVENTION

1. Field of the Invention

The present invention pertains to electronic inventorying of multiple objects and, more particularly, to a method of inventorying nested and remote objects utilizing a multi-level or chained radio frequency identification tag system.

2. Description of the Related Art

Accurate inventorying of bulk articles is vital to many aspects of business and governmental functions. Tracking the shipment and distribution of goods provides verification and accurate accounting, which enables effective management of resources, income, and expenses. It also enables monitoring the whereabouts of goods and equipment, such as military equipment, files containing sensitive information, and the like that are critical to local and national security.

Bulk articles stored in containers can be difficult to identify and track. Because they are not visible when stored in the container, bulk articles are not available for visual inspection and verification, and changes in their number and condition are not easily monitored. Doing so requires manual labor and breaking of the security of the container, which can result in compromising the condition of the goods and in delay of the shipment and distribution of the goods.

Bar codes are ineffective in monitoring bulk goods stored in containers because reading of the bar codes requires access to each object or its packaging. While X-ray is possible, it is not available for every type of material. In addition, X-rays do not provide a clear view of each item, and this requires an operator to count each item. Magnetic strips, unlike bar codes, are capable of being read and written to for continual updating. However, like bar codes, they are also not feasible for use with closed containers because, like bar codes, they must be accessible to an electronic strip reader.

Radio frequency identification (RFID) is another system used for tracking and identifying objects. A key feature of the RFID system is an information-encoded tag that responds to an interrogation signal from an interrogator. Generally, the tag is configured to return the interrogation signal via backscatter reflection. The reflected signal is modulated in accordance with the information stored in the tag.

As shown in FIG. 1, a basic RFID system 10 includes two components: an interrogator or reader 12 and a transponder (commonly called the RF tag) 14. The interrogator 12 and RF tag 14 include respective antennas 16, 18. In operation, the interrogator 12 transmits through its antenna 16 a radio frequency interrogation signal 20 to the antenna 18 of the RF tag 14. In response to receiving the interrogation signal 20, the RF tag 14 produces a backscatter modulated response signal 22 that is reflected back to the interrogator 12 through the tag antenna 18. This process is known as modulated backscatter.

The substantial advantage of RFID systems is the non-contact, non-line-of-sight capability of the technology. The interrogator 12 emits the interrogation signal 20 with a range from 1 inch to 100 feet or more, depending upon the power output and the radio frequency used. Tags can be read through a variety of medium, such as fog, ice, paint, dirt, odors, and other substances, including visually and environmentally challenging conditions where bar codes or other optically read technologies would be useless. RF tags can also be read at remarkable speeds, in most cases responding in less than 100 milliseconds.

A typical RF tag system 10 will contain a number of RF tags 14 and a single interrogator 12. The three main categories of RF tags are beam-powered passive tags, battery powered semi-passive tags, and active tags. Each operates in fundamentally different ways.

The beam-powered RF tag is often referred to as a passive device because it derives the energy needed for its operation from the interrogation signal beamed at it. The tag rectifies the field and changes the reflective characteristics of the tag itself, creating a change in reflectivity that is seen at the interrogator. A battery powered semi-passive RFID tag operates in a similar fashion, modulating its RF cross-section in order to reflect a delta to the interrogator to develop a communication link. Here, the battery is the source of the tag's operational power. Finally, in the active RF tag, a transmitter is used to create its own radio frequency energy powered by the battery.

Conventional continuous wave backscatter RF tag systems utilizing passive RF tags require adequate power from the interrogation signal 20 to power the internal circuitry in the RF tag 14 used to amplitude-modulate the response signal 22 back to the interrogator. While this is successful for tags that are located in close proximity to an interrogator, for example, less than three meters, this may be insufficient range for some applications, for example, which require greater than 100 meters.

There is a need for an RF tag system that can monitor the condition of goods stored in bulk containers and nested within other goods and containers. This need includes the ability to read tags that are out of RF range of the reader.

BRIEF SUMMARY OF THE INVENTION

The disclosed embodiments of the invention are directed to a system and method for identifying and tracking multiple remote objects, particularly objects that are nested within containers, the system and method utilizing a multi-level RFID tag system or a chained RFID tag system.

In accordance with one embodiment of the invention, a system for tracking a plurality of objects stored in a container is provided. This system includes a plurality of first radio frequency identification tags, each tag configured for attachment to an individual corresponding object in the container; a second RFID tag associated with the container, the second RFID tag configured to communicate with the plurality of first tags and to store information regarding the plurality of first tags.

In accordance with another aspect of the foregoing embodiment, a remote interrogator is provided that communicates with the second RFID tag to initiate generation of an output signal corresponding to the information stored in the second RFID tag.

In accordance with another embodiment of the invention, a system for tracking a plurality of objects stored in a container is provided that includes a plurality of RFID tags associated with a corresponding object in the container, each tag configured to communication with other tags and receive and store information from the other tags; and a reader configured to query the plurality of tags and to receive from any one of the plurality of tags the information read from the other plurality of tags.

In accordance with yet another embodiment of the invention, a communication system and method is provided for remote monitoring of objects, the system and method include a plurality of RFID tags and a reader configured to read the plurality of RFID tags that are within its communication range, each tag configured to read other tags within its communication range to relay information from remote tags to the reader. Ideally, tags within range of the reader can read tags outside the range of the reader and provide to the reader the information from the tags outside of the range of the reader.

As will be readily appreciated from the foregoing, the system and method of the present invention provides a saving of time in assessing the condition of a plurality of objects in that it avoids reading all of the contents of a container in a serial manner. Rather, in the embodiment utilizing a master tag and a plurality of first tags, the master tag is read only once in order to ascertain the inventory of the container. If the contents change, the system and method of the invention enables rewriting the new updated inventory to the master tag. Alternatively, the embodiment with the plurality of tags allows any one tag to receive all of the information regarding the other tags and to be read quickly and easily, including tags out of range of the reader or interrogator. Thus, a quick inventory can be done by query of the single tag somewhere in the interior or on the exterior of the containment device, such as a room, container, or box. Additionally, inventory of a large group may be done very rapidly in accordance with the method of chained communication wherein tags outside the range of a reader can be set to quickly notify the absence of another tag, and thus the associated object or asset, whereby the entire population is then notified of the change in condition. Thus, an indication of a hazard condition and its location could be quickly chained to a system controller without expensive wiring and overhead.

BRIEF DESCRIPTION OF THE SEVERAL VIEWS OF THE DRAWING(S)

The foregoing features and advantages of the disclosed embodiments of the present invention will be more readily appreciated as the same become better understood from the following detailed description when taken in conjunction with the accompanying drawings, wherein.

DETAILED DESCRIPTION OF THE INVENTION

The system and method of the present invention are directed to electronic monitoring and inventorying of multiple objects, particularly nested and remote objects, utilizing a multi-level or chained radio frequency identification tag configuration.

Figure 2:
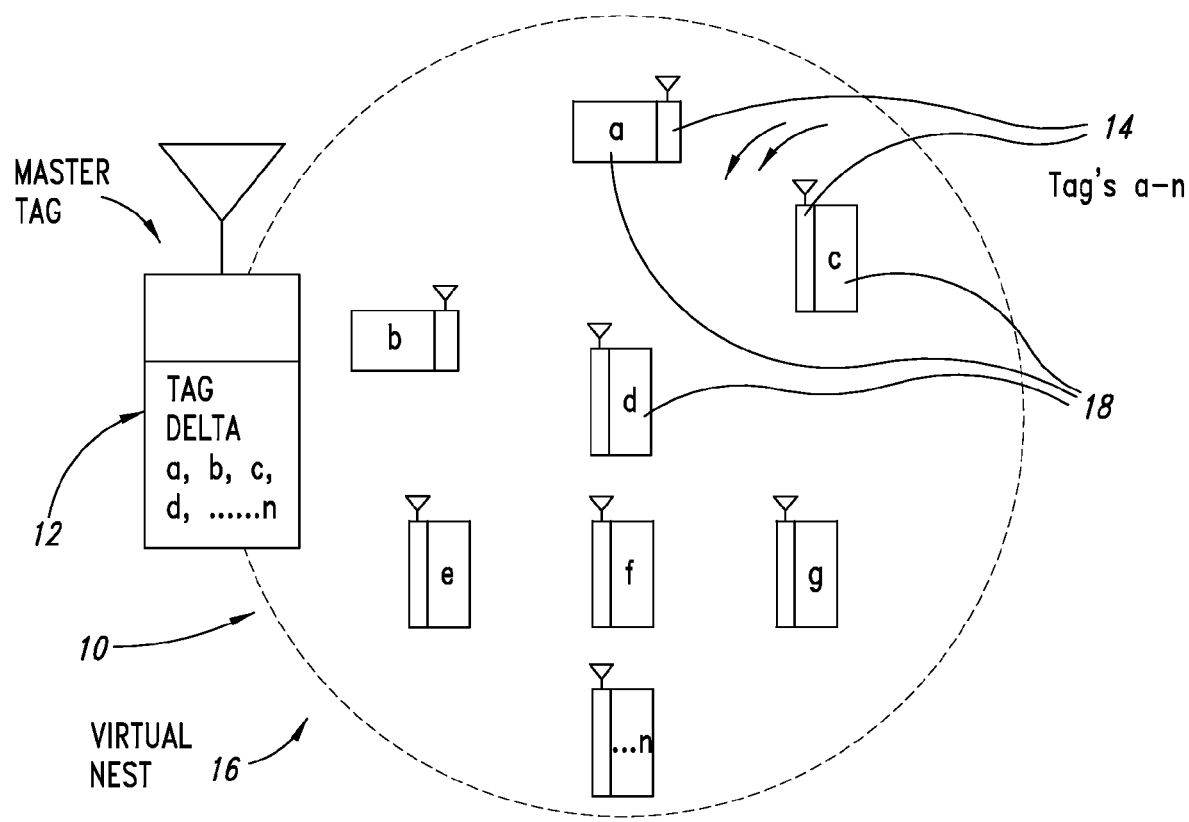
FIG. 2 is a schematic representation of a remote inventory system in accordance with a first embodiment of the invention.

In one embodiment of the invention, illustrated in FIG. 2, a system 10 is shown to include a master tag 12 and a plurality of lower level tags 14*a-n*.

Figure 1:
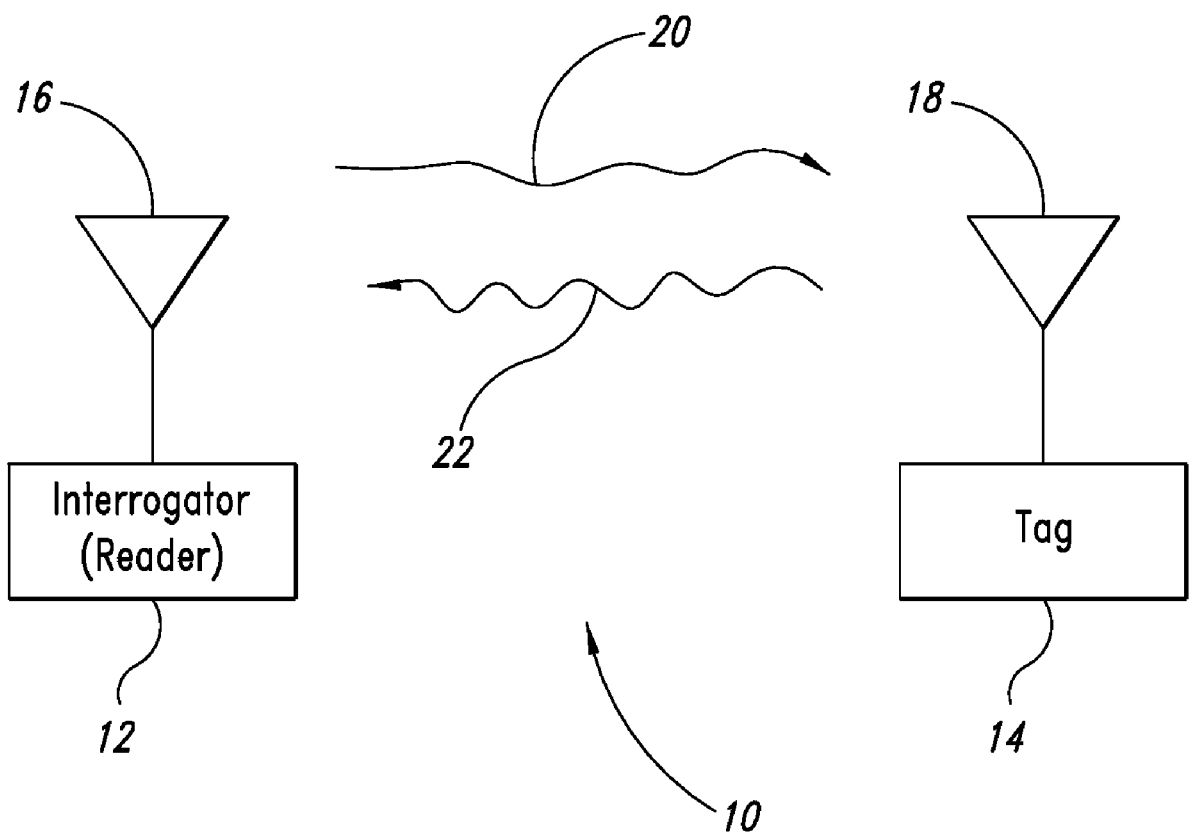
FIG. 1 is a schematic representation of a prior art RFID system.

Each lower level tag 14*a-n* is preferably a passive radio frequency backscatter tag having a unique memory associated with an object 18*a-n* to which the tag is attached. Because the lower level tag is of a conventional design, such as the radio frequency tag described above with respect to FIG. 1, it will not be described in detail herein. It is to be appreciated that while passive lower level radio frequency tags are preferred for efficiency and economy, semi-active and active tags may also be used.

Ideally, the lower level tags 14*a-n* are configured to be read only. However, in accordance with another embodiment of the invention, the master tag 12 and lower level tags 14*a-n* may be radio frequency tags of the transmitter, active, or passive backscatter type, as described in more detail hereinbelow.

The lower level tags 14*a-n* are grouped together in a nest 16 (depicted in dashed lines in FIG. 2) that could be a container, room, box, or having the tags 14*a-n* in a certain area in close proximity to each other. A plurality of objects 18*a-n*, each associated with one of the lower level tags 14*a-n*, are stored together to form the nest 16.

The master tag 12 comprises a read-write radio frequency identification tag of conventional design and will not be described in detail herein. Preferably it resides on the container, room, or box in which the objects 18*a-n* are stored. After an initial inventory of the nest 16 is taken, the inventory information is written to the master tag 12. Subsequent inventories of the contents or subsequent queries of this master tag 12 will now quickly determine the contents of the nest 16, such as a container, room, box, or area. With this method, time is saved because all of the contents do not have to be read again in a serial manner. Should the contents change, such as one of the objects 18*a-n* being removed from the nest 16, the master tag 12 can be rewritten with the updated inventory information.

Figure 3:
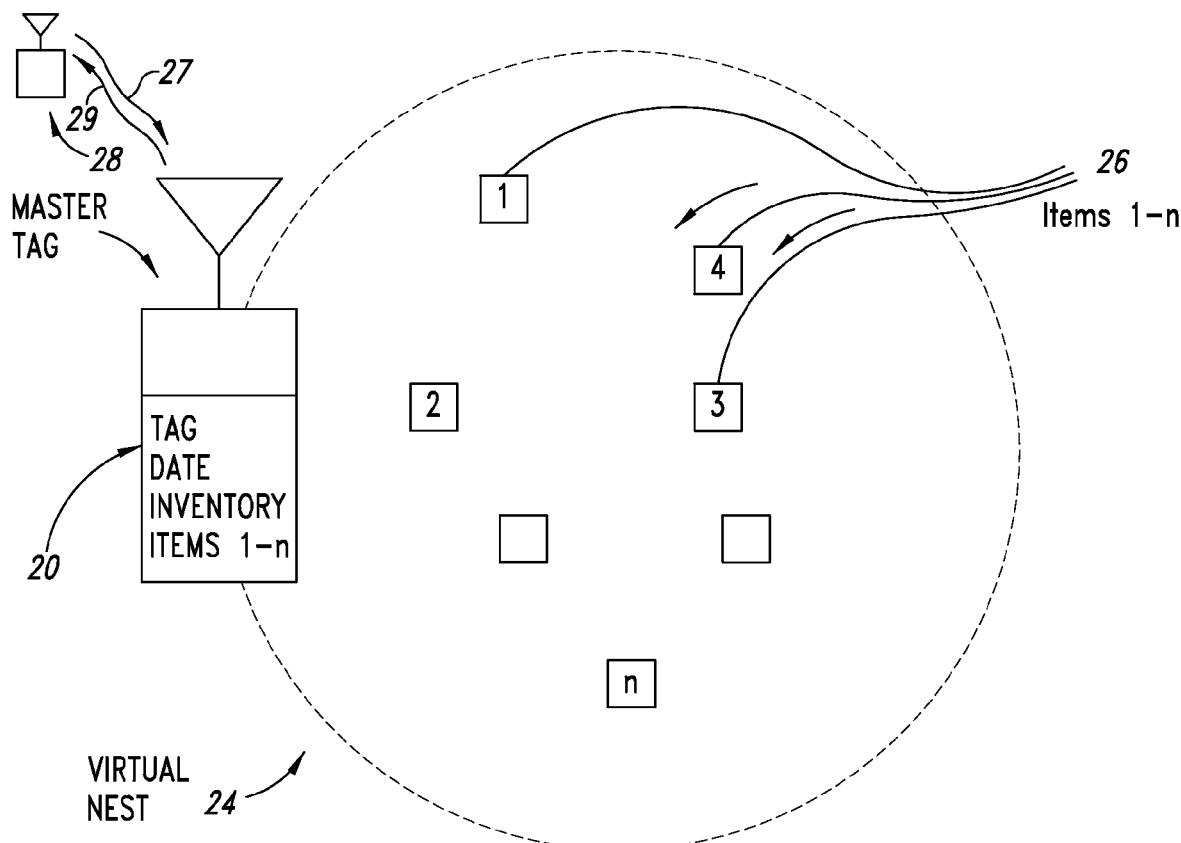
FIG. 3 is a schematic representation of a second embodiment of the system of the present invention.

Referring next to FIG. 3, shown therein is a master tag 20 that contains data related to the contents 22 of a nest 24 of items 26 stored in a room, container, box, or defined area. In this embodiment, no lower level tags are present. Rather, the information regarding the contents of the room, container, or box is held in the memory of the master tag 20. As the inventory changes, the read-write master tag 20 can be rewritten to reflect the change in the inventory. A quick inventory can now be done by query of the single tag somewhere in the interior on the exterior of the room, container, or box. A reader or interrogator 28 is used to assess the contents of the nest 24 via an interrogation signal 27 that is returned via a backscatter reflection signal 29.

Figure 4:
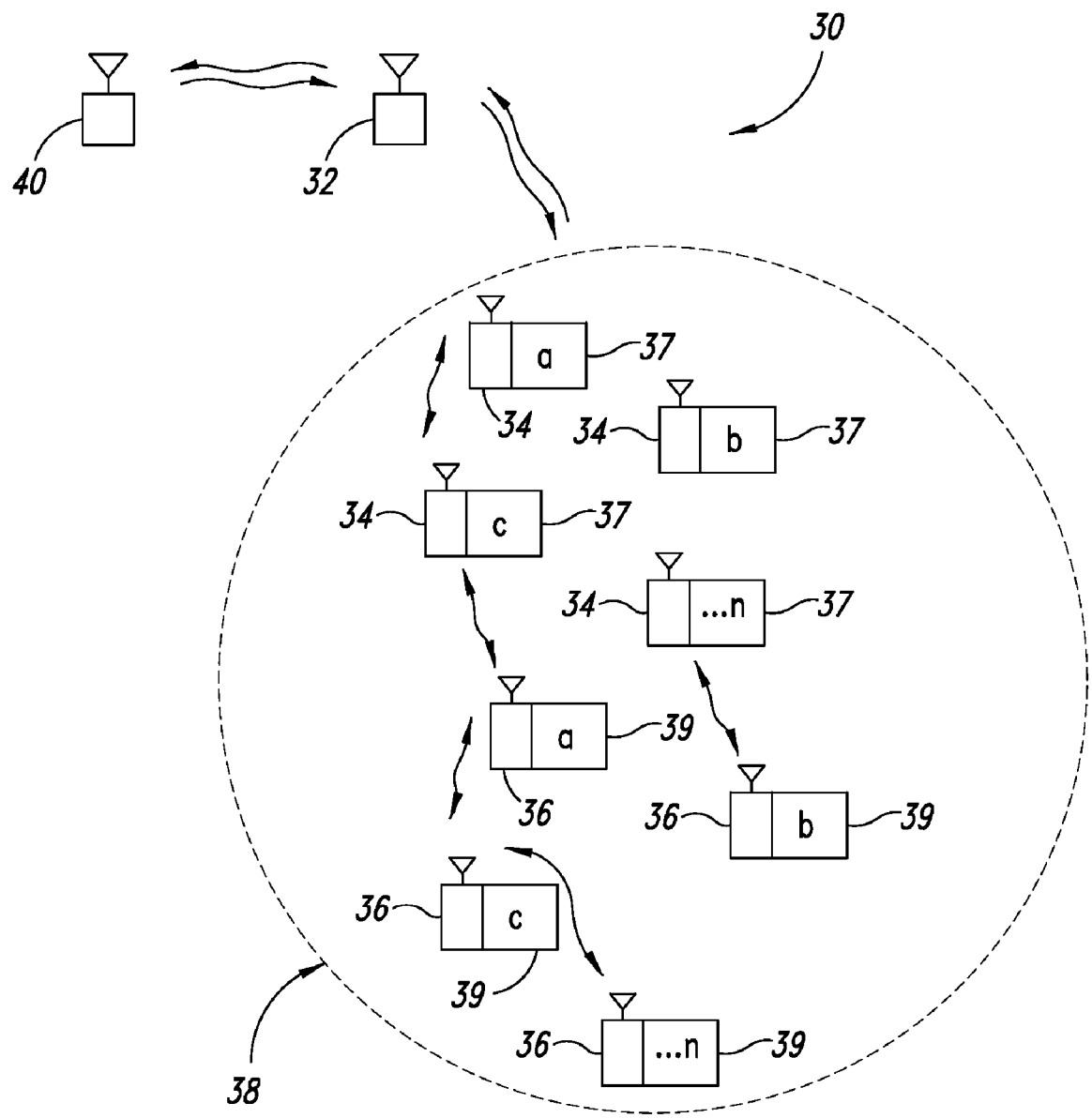
FIG. 4 is a schematic representation of a system formed in accordance with a third embodiment of the present invention.

Referring next to FIG. 4, shown therein is a further embodiment of the present invention wherein a chained radio frequency identification tag system 30 is depicted to include a master tag 32 and a plurality of upper level tags 34*a-n* associated with objects 37*a-n* and lower level tags 36*a-n* associated with objects 39*a-n*. Each of the upper and lower level tags 34a-n, 36a-n has the ability to be read or to be written to. All of the tags within the given area 38 (shown with dashed lines) are configured to communicate with one another via radio frequency communication in accordance with a preferred embodiment. However, it is not necessary that each of the tags 34a-n, 36a-n be capable of communicating with every other tag within the area 38. In this embodiment, low range tags can be used, resulting in lower cost and longer battery life components (where such are used).

Total inventory information can be accumulated, updated, and passed between the upper and lower level tags 34a-n, 36a-n, and to the master tag 32. Over time, all tags receive and store information relating to all other tag's identifications, and thus the contents of the entire area 38. As such, any single tag contains inventory information identical with all other tags within its range. The area of range may be physical, or the area of the tags may be logical, and this may be programmed into the tag. The area may be allowed to be set by physical transmission restraints.

The system further includes a reader 40 that queries any particular tag within the area 38. The reader 40 is now given information relating to the entire inventory from any of the lower level or upper level tags 34a-n, 36a-n. In this embodiment, an inventory of a large group may be done very rapidly.

Additionally, the lower and upper level tags 34a-n, 36a-n, may be set to quickly notify the absence of another tag, and thus an object or asset associated therewith. For example, if a first tag 34c had been in communication with a second tag 36a for some period of time and then the communication link disappears, it is logical to assume that the second tag 36a, and thus its associated asset 39a, have been removed. The first tag 34a would then send notification to those tags within its range, which tags would in turn do the same. Within a very short period of time, the entire population of lower and upper level tags 34a-n, 36a-n would be notified that an asset had been removed.

Figure 5:
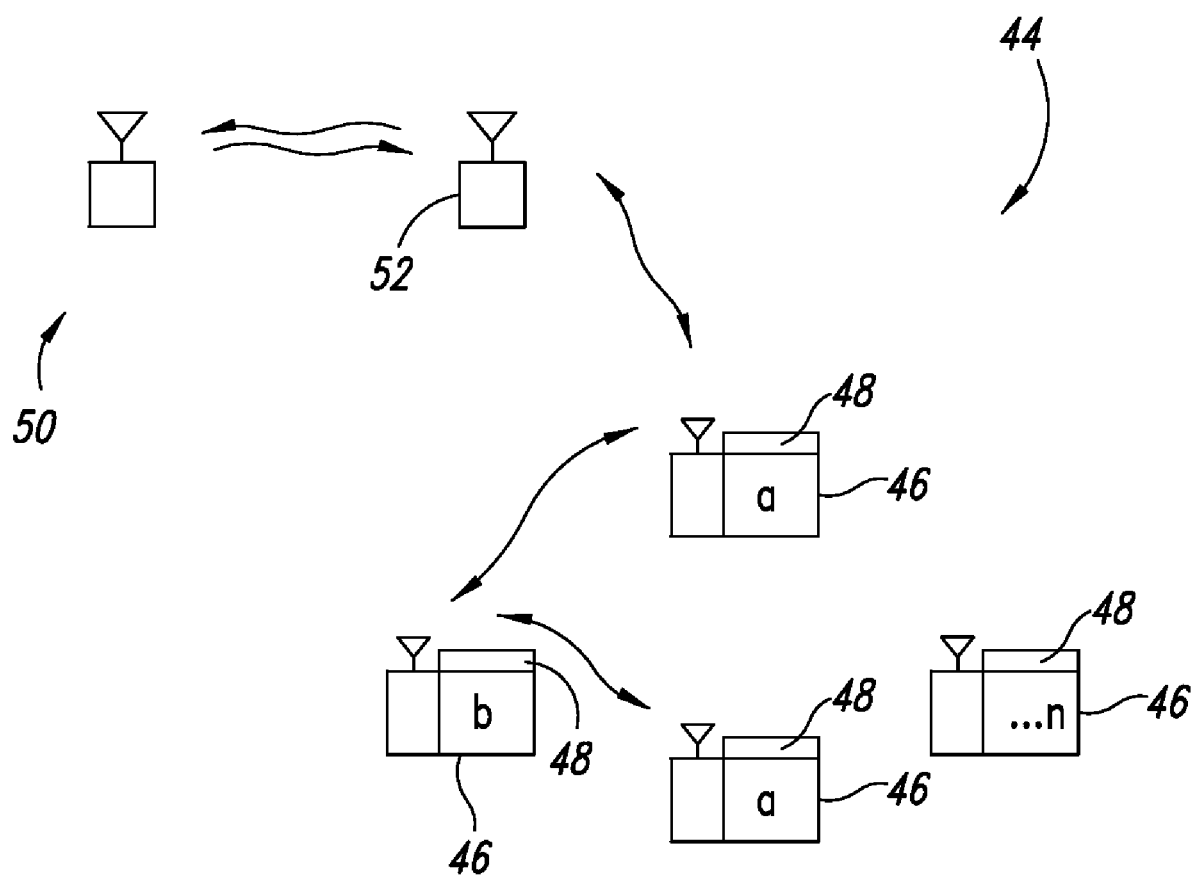
FIG. 5 is a schematic representation of a system formed in accordance with a further embodiment of the invention.

In accordance with another aspect of the foregoing embodiment, any one or all of the lower and upper level tags 34a-n, 36a-n may be configured as read-write tags that are integrated with an alarm or input device that uses the communication link of the associated tag to chain the status of its sensor to higher levels of the system. More particularly, as shown in FIG. 5, the system 44 includes a plurality of read-write tags 46a-n that are low range tag and sensor combinations having the ability to communicate with other such tags. The range of each individual tag 46a-n is limited, and as such low-cost and long-battery-life components may be used. When the sensor 48 indicates a condition requiring a response, the tag 46a-n begins transmission of its condition and its identification. Any other tag within the communication range will receive and repeat this transmission until the message reaches the system controller 50 via the master tag 52, which is in two-way radio frequency communication with the controller 50.

An example of the foregoing might be a tag/sensor used as a fire detection device. Used in this manner, an indication of a hazard condition and its location can be quickly chained to the system controller 50 without expensive wiring and overhead. Such devices are easily placed, and the condition of the sensor could be queried in a similar chained manner. Other examples of use could be tags used as burglar alarms, thermostats, smoke detectors, or lighting controls.

While preferred embodiments of the invention have been illustrated and described, it is to be understood that various changes may be made therein without departing from the spirit and scope of the invention. Thus, the invention is to be limited only by the scope of the claims that follow and the equivalents thereof.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

From the foregoing it will be appreciated that, although specific embodiments of the invention have been described herein for purposes of illustration, various modifications may be made without deviating from the spirit and scope of the invention. Accordingly, the invention is not limited except as by the appended claims and the equivalents thereof.

The invention claimed is:

1. A system for tracking a plurality of objects stored in a containment device, comprising:
    a plurality of beam-powered passive radio frequency identification (RFID) tags, each of the plurality of beam-powered passive RFID tags configured for association with a corresponding object in the containment device, and each of the plurality of beam-powered passive RFID tags configured to derive power solely from an interrogation signal; and
    an active RFID tag configured for association with the container, the active RFID tag configured to communicate with the plurality of beam-powered passive RFID tags, to store information received from at least one of the plurality of beam-powered passive RFID tags, and to respond to the interrogation signal to relay the stored information.

2. The system of claim 1, further comprising a remote interrogator configured to communicate with the active RFID tag via the interrogation signal and to receive an output from the active RFID tag corresponding to information stored in the active RFID tag.

3. The system of claim 1 wherein the containment device comprises one from among a container, a box, a jar, a room, a vehicle, a vehicle trailer, an envelope, a file, and a device.

4. A system for tracking a plurality of objects stored in a containment device, comprising:
    a plurality of beam-powered passive radio frequency identification (RFID) tags configured for association with corresponding objects in the containment device, each beam-powered passive RFID tag adapted to communicate with at least one other of the plurality of beam-powered passive RFID tags within its range and with at least one other of the plurality of RFID tags outside of its range through the at least one other of the plurality of RFID tags within its range to provide a chained communication link among all of the plurality of beam-powered passive RFID tags in the system to read and store information from all of the other beam-powered passive RFID tags, each beam-powered passive RFID tag adapted to send notice to the other beam-powered passive RFID tags when a communication link disappears; and
    an interrogator configured to query the plurality of beam-powered passive RFID tags by transmitting a signal, the plurality of beam-powered passive RFID tags configured to generate operating power solely from the signal transmitted from the interrogator, the interrogator configured to receive from any one of the plurality of beam-powered passive RFID tags the information received from all of the other plurality of beam-powered passive RFID tags that have communicated with the beam-powered passive RFID tag queried by the reader.

5. The system of claim 4, further comprising an active RFID tag configured for association with the containment device, the active RFID tag configured to communicate with the plurality of beam-powered passive RFID tags, to store information, and to respond to an interrogation signal to relay the stored information.

6. A method of inventorying remote objects stored in a defined area, comprising:
- associating a plurality of beam-powered passive asset radio frequency tags configured for read and write operations with a respective object, each tag communicating with other tags within its range and other tags outside of its range through the other tags within its range, the beam-powered passive asset tags generating operating power solely from a received radio frequency interrogation signal;
- providing an active master tag configured to store information regarding the status of the beam-powered passive asset tags associated with their respective objects, the master tag adapted to automatically communicate a notice of a missing communication link with at least one of the asset tags; and
- reading the master tag to determine the contents of the defined area.

7. The method of claim 6 wherein providing the master tag comprises writing to the master tag information regarding the objects stored in the defined area on a periodic basis to update the information in the master tag.

8. The method of claim 6 wherein the master tag is configured to read the asset tags associated with the respective objects to determine the asset tags, and hence the associated objects, present in the defined area.

9. The method of claim 8 wherein the defined area comprises one of either a container, a box, and a room, and further wherein the master tag is associated with the container, box, or room.

10. A system for tracking a plurality of objects stored in a containment device, comprising:
- a plurality of first radio frequency identification (RFID) tags, each first RFID tag configured for association with a corresponding object in the containment device, each first RFID tag configured to communicate with other first RFID tags within its range and with other first RFID tags outside its range through the other first RFID tags within its range so each first RFID tag communicates with all the other of the first RFID tags a notification of a changed condition without being first interrogated and upon sensing the changed condition or upon receiving notification of a changed condition from another of the plurality of first RFID tags, the changed condition including an absence of communication with at least one first RFID tag; and
- a second RFID tag configured as an active RFID tag for association with the container, the second RFID tag communicating with the plurality of first RFID tags to store information and to respond to an interrogation signal from a remote interrogator to relay the stored information.

11. The system of claim 10 wherein the remote interrogator is configured to communicate with the second RFID tag via the interrogation signal and to receive an output from the second RFID tag corresponding to information stored in the second RFID tag.

12. The system of claim 10 wherein the containment device comprises one from among a container, a box, a jar, a room, a vehicle, a vehicle trailer, an envelope, a file, and a device.

13. A method of inventorying remote objects stored in a defined area, comprising:
- associating first radio frequency tags configured for read and write operations regarding a respective object, to store information about a condition of the first tags, and to transmit to other of the first tags within communications range of the first tags and transmit to all of the other of the first tags out of communications range through the other of the first tags within communications range a notification of a change in the condition and without being first interrogated wherein transmitting notification of the change in the condition includes transmitting notification of an absence of communication with another first radio frequency tag within communications range;
- providing a master active radio frequency tag configured to store information regarding the condition information stored in the first tags associated with their respective objects; and
- reading the master tag to determine the location condition of the remote objects in the defined area.

14. The method of claim 13 wherein providing the master tag comprises writing to the master tag information regarding the objects stored in the defined area on a periodic basis to update the information in the master tag.

15. The method of claim 13 wherein the master tag is configured to read the first tags associated with the respective objects to determine the first tags, and hence the associated objects, present in the defined area.

16. The method of claim 15 wherein the defined area comprises one of either a container, a box, and a room, and further wherein the master tag is associated with the container, box, or room.

17. A system of inventorying multiple objects utilizing multi-level or chained radio frequency identification tags, the system comprising:
- a master tag and a plurality of upper level tags and lower level tags associated with respective objects, the upper and lower level tags adapted to communicate with each other and the master tag so that reading of the master tag reveals the presence and absence of upper and lower level tags, the upper and lower level tags adapted to communicate locally with each other in a manner so that all remote tags that are out of range of some of the upper and lower level tags have their information relayed through adjacent tags to the master tag and thence to a controller, the upper and lower level tags adapted to store the information of all of the remote tags relayed through adjacent tags.

18. The system of claim 17 wherein the lower level tags are passive beam-powered tags.

19. The system of claim 18 wherein the upper level tags are passive beam-powered tags.

* * * * *